Patented Oct. 22, 1929

1,732,806

UNITED STATES PATENT OFFICE

WILLIAM A. GALE AND CHARLES FISHER RITCHIE, OF TRONA, CALIFORNIA, ASSIGNORS, BY MESNE ASSIGNMENTS, TO AMERICAN POTASH & CHEMICAL CORPORATION, OF NEW YORK, N. Y., A CORPORATION OF DELAWARE

ART OF REFINING BORATES

No Drawing.    Application filed January 27, 1925. Serial No. 5,158.

This invention in its broadest terms, relates to the production of borates, substantially free of phosphates, from solids or liquors containing phosphates and borates.

In the liquors resulting from the evaporation of certain natural saline waters, such as the brine of Searles Lake, in California, considerable quantities of soluble phosphate occur with the liquors containing borates. We are aware of the fact that the $P_2O_5$ content of Searles Lake brine is less than one tenth of one per cent of the total weight of the brine. However, in the normal operation of a cyclical process, where end liquors are returned for re-evaporation, the $P_2O_5$ content builds up, until the solubility of some phosphate salt is reached, and the phosphate salt is precipitated from the liquors.

We have found, as we have described in companion applications for Letters Patent, that under certain conditions the phosphate precipitates with the borax. To one skilled in the art, it is apparent that appreciable quantities of phosphates in a refined borax are very undesirable.

Our present invention relates to the production of borates, such as common borax, essentially free from phosphate impurities, and is based on the removing of the objectionable material from solution, through the formation of an insoluble phosphate.

We have found a large number of reagents suitable to the consummation of our invention. In general, the soluble or slightly soluble salt of any metal having an insoluble phosphate and a soluble or slightly soluble borate may be employed. Although we have employed a large number of materials, we have found that the soluble or slightly soluble compounds of the alkaline earth metals are the most satisfactory and economical.

We are aware of the fact that the compounds of the alkaline earth metals have previously been employed in the art of refining borates. In the prior art, however, sufficient of the salt was employed to precipitate essentially the entire $B_2O_3$ content as an insolube borate. We have found the process of precipitating borates as insoluble compounds and subsequently re-converting the same to borax is a very inefficient process as compared with our invention, as set forth herein after.

Although the borates of calcium and magnesium have been considered as insoluble salts, such salts are, in fact, slightly soluble, having solubilities comparable with calcium sulfate and calcium hydroxide. As compared with such salts as calcium carbonate and calcium phosphate, the above mentioned salts may be considered as essentially soluble.

We take advantage of these differences in solubilities of the above mentioned two classes of compounds to accomplish our invention. We prefer to employ a salt of some metal having a solubility approximating that of the corresponding borate of the same metal, whose phosphate is highly insoluble. In case we choose to employ a very soluble compound of a metal whose borate is slightly soluble and whose phosphate is highly insoluble, we are careful to add only as much of the aforementioned soluble salt as is necessary to precipitate the undesirable constituents of the liquor; for it must be understood that our invention is based on the precipitation of the very insoluble phosphates without appreciable precipitation of the slightly soluble borates. Hence it is obvious to one familiar with chemical principles that a large excess of the precipitating reagent must be avoided in order to avoid the precipitation of borates.

One of the preferred methods of carrying out our invention is through the addition of an alkaline earth metal borate, such as a calcium borate. We have found that the sparingly soluble alkaline earth metal borates react with the soluble phosphates and remove them from solution as insoluble alkaline earth metal phosphates. By this procedure, we not only accomplish the removal of the undesirable phosphates, but also add a certain amount of desirable, soluble borates to the system.

Another method that we have found quite satisfactory in carrying out or invention is the addition of calcium sulfate to the liquors containing borates and phosphates. We have found that essentially all the phosphates were removed from solution, and that the borax subsequently crystallized from the liquor was free from phosphates. The precipitate containing the calcium phosphate was found to be essentially free from calcium borates.

We have also discovered that milk of lime, $Ca(OH)_2$, in solution and suspension may be successfully employed to precipitate the soluble phosphates. We have found the resulting precipitate containing the calcium phosphate to be essentially free from calcium borates.

We have also successfully employed more soluble compounds of the alkaline earth metals, such as barium chloride and magnesium sulfate, to precipitate the soluble phosphates. We have found, when the theoretical amounts of these soluble salts (to precipitate only the undesirable constituents of the liquors) are employed, that essentially no borate is precipitated.

The invention will be further illustrated by the following specific example of the application of the process to the treatment of liquor from Searles Lake brine. The plant liquor known as concentrated borax liquor was used having the following composition:

| | Per cent |
|---|---|
| Total $B_2O_3$ | 9.36 |
| Total $P_2O_5$ | 1.48 |
| Total KCl | 6.44 |
| Total $Na_2CO_3$ | 2.00 |
| Total NaCl | 2.07 |

Various reagents, indicated below, were added to this liquor in small amounts of water and the mixture kept at 90°C. for one hour or more. The solids were then filtered off and washed thoroughly with cold water to remove the adhering borax liquor. The filtrate was cooled to 20°C and a crop of borax recovered. The $B_2O_3$ was determined in the washed precipitate. The $P_2O_5$ was determined in the crystallized borax. The following is a tabulation of the results, the grams of reagent representing the amount used for 1000 grams of the liquor of the composition above indicated.

| Treatment | Per cent of original $B_2O_3$ in precipitate | Per cent $P_2O_5$ in refined borax |
|---|---|---|
| Original liquor no treatment | | 2.97 |
| Treated with 55 gm. calcium borate (33% CaO) | | 0.03 |
| Treated with 52 gm. $CaSO_4.2H_2O$ | 1.4 | 0.08 |
| Treated with 19 gm. CaO | 3.8 | 0.62 |
| Treated with 70 gm. $BaCl_2.2H_2O$ | 0.1 | 0.02 |
| Treated with 38 gm. $Fe_2(SO_4)_3$ | 6.3 | 0.05 |
| Treated with 71 gm. $MgSO_4.7H_2O$ | 3.1 | 0.09 |
| Treated with 109 gm. $Pb(C_2H_3O_2)_2.3H_2O$ | 0.3 | 0.01 |

Considerations of economy, ease of filtration of precipitates, etc., have been the determining factors of our choosing the above as examples of our invention. Although we have confined our description of our invention to these few examples, we do not wish to limit its usefulness to these materials alone; for as we have previously explained, a great variety of materials may be employed.

We have also found our invention of value in refining solid borax containing phosphates. In this case the solid borax is dissolved and the resulting solution treated as previously described.

It will thus be seen that the present invention provides an improved process of refining borates and of obtaining borates substantially free from phosphates from liquors and salts containing phosphate impurities, by treating the solution containing the borax and the phosphate impurities with a reagent which will precipitate the phosphate in an insoluble form from the solution without appreciable precipitation of borate. It will also be seen that the reagents which may be used may vary widely in character and may include not only soluble compounds, but also compounds of limited solubility which react to form insoluble phosphates.

We claim:

1. In the process of refining borates in the presence of phosphates, the step of adding a sufficient quantity of a relatively soluble salt of a metal forming an insoluble phosphate and a slightly soluble borate to precipitate the phosphate without appreciably precipitating the borate.

2. In the process of refining borates in the presence of phosphates, the step of adding a slightly soluble borate of a metal forming an insoluble phosphate to precipitate the phosphate and liberate a soluble borate.

3. In the process of refining borates in the presence of phosphates, the step of adding a slightly soluble alkaline earth metal salt to precipitate the phosphate without appreciably precipitating the borate.

4. In the process of refining borates in the presence of phosphates, the step of adding calcium borate to precipitate the phosphate.

In testimony whereof we affix our signatures.

WILLIAM A. GALE.
CHARLES FISHER RITCHIE.